United States Patent
Li et al.

(10) Patent No.: US 12,195,686 B2
(45) Date of Patent: Jan. 14, 2025

(54) ANTISTATIC FUEL ADDITIVES

(71) Applicant: Ecolab USA Inc., St. Paul, MN (US)

(72) Inventors: Xiaojin Harry Li, Bartlett, IL (US); Ashish Dhawan, Aurora, IL (US); Nestor Soriano, Missouri City, TX (US); John Matthew Chudomel, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 18/153,151

(22) Filed: Jan. 11, 2023

(65) Prior Publication Data

US 2023/0220291 A1    Jul. 13, 2023

Related U.S. Application Data

(60) Provisional application No. 63/299,342, filed on Jan. 13, 2022.

(51) Int. Cl.
   *C10L 1/24*    (2006.01)
   *C08G 63/685*  (2006.01)
   *C10L 1/2383*  (2006.01)

(52) U.S. Cl.
   CPC ........ *C10L 1/2475* (2013.01); *C08G 63/6852* (2013.01); *C10L 1/2383* (2013.01); *C10L 2230/08* (2013.01); *C10L 2270/026* (2013.01)

(58) Field of Classification Search
   CPC .. C10L 1/2475; C10L 1/2383; C10L 2230/08; C10L 2270/026; C08G 63/6852
   See application file for complete search history.

(56) References Cited

U.S. PATENT DOCUMENTS

| | | |
|---|---|---|
| 3,364,000 A | 1/1968 | Stromberg |
| 3,807,977 A | 4/1974 | Johnston et al. |
| 4,834,776 A | 5/1989 | Axelrod et al. |
| 4,881,945 A | 11/1989 | Buckley, III |
| 5,032,145 A | 7/1991 | Axelrod et al. |
| 5,234,476 A | 8/1993 | Garapon et al. |
| 5,435,812 A | 7/1995 | Abramo et al. |
| 5,456,731 A * | 10/1995 | Blain ................. C10L 10/08 44/331 |
| 5,540,743 A | 7/1996 | Cherpeck |
| 5,756,428 A * | 5/1998 | Emert ................. C10L 1/238 508/293 |
| 6,107,450 A | 8/2000 | Harrison et al. |
| 6,179,885 B1 | 1/2001 | McAtee |
| 6,379,530 B1 | 4/2002 | Moreton |
| 6,391,070 B2 | 5/2002 | Schield |
| 6,793,695 B2 | 9/2004 | Wilkes et al. |
| 7,044,988 B2 | 5/2006 | Filippini et al. |
| 8,409,474 B2 | 4/2013 | Lange et al. |
| 8,974,551 B1 | 3/2015 | Fang et al. |
| 9,200,226 B1 | 12/2015 | Fang |
| 9,399,011 B2 | 7/2016 | Wagner et al. |
| 10,308,888 B1 | 6/2019 | Schwab |
| 2002/0091068 A1 | 7/2002 | Loper |
| 2003/0172584 A1 | 9/2003 | Henly et al. |
| 2004/0055677 A1 | 3/2004 | Filippini et al. |
| 2004/0182743 A1 | 9/2004 | MacMillan |
| 2004/0231232 A1 | 11/2004 | Ambrosini et al. |
| 2005/0183325 A1 | 8/2005 | Sutkowski |
| 2005/0215441 A1 | 9/2005 | Mackney et al. |
| 2005/0223627 A1 | 10/2005 | Eydoux et al. |
| 2007/0027046 A1 | 2/2007 | Friend et al. |
| 2007/0193110 A1 | 8/2007 | Schwab et al. |
| 2007/0220803 A1 | 9/2007 | Henry |
| 2007/0283618 A1 | 12/2007 | Malfer et al. |
| 2008/0141581 A1 | 6/2008 | Caprotti et al. |
| 2008/0216394 A1 | 9/2008 | Schwab |
| 2008/0256849 A1 | 10/2008 | Kulinowski et al. |
| 2009/0025284 A1 | 1/2009 | Lange et al. |
| 2009/0077869 A1 * | 3/2009 | Schwab ................. C10L 1/143 44/370 |
| 2009/0094887 A1 | 4/2009 | Calvert et al. |
| 2009/0320354 A1 | 12/2009 | Kormann et al. |
| 2010/0107478 A1 | 5/2010 | Zamudio Rivera et al. |
| 2011/0302828 A1 | 12/2011 | Fang et al. |
| 2012/0102826 A1 | 5/2012 | Fang |
| 2012/0255512 A1 | 10/2012 | Galante-Fox et al. |
| 2013/0031827 A1 | 2/2013 | Reid et al. |
| 2013/0074874 A1 | 3/2013 | Fang et al. |
| 2013/0296207 A1 | 11/2013 | Posselt et al. |

(Continued)

FOREIGN PATENT DOCUMENTS

| | | |
|---|---|---|
| CA | 2613953 A1 | 6/2008 |
| CN | 100999686 A | 7/2007 |
| CN | 101260329 A | 9/2008 |
| CN | 101886002 A | 11/2010 |
| EP | 1348754 A2 | 10/2003 |
| EP | 1887074 A1 | 2/2008 |
| WO | 98/02507 | 1/1998 |
| WO | 2011/110860 A1 | 9/2011 |
| WO | 2012/076428 A1 | 6/2012 |
| WO | 2013/000997 A1 | 1/2013 |

(Continued)

OTHER PUBLICATIONS

International Search Report and Written Opinion dated Mar. 29, 2023 relating to PCT/US2023/060473, 8 pages.

*Primary Examiner* — Vishal V Vasisth

(74) *Attorney, Agent, or Firm* — Stinson LLP

(57) ABSTRACT

An anti-static fuel additive composition and method for using the composition to reduce or prevent buildup of electrostatic charge is described. The anti-static fuel additive composition comprises a polysulfone and a copolymer derived from reaction of an alkanolamine and a hydrocarbyl-substituted 4-membered to 7-memebered ring anhydride; for example, a hydrocarbyl-substituted succinic anhydride, a hydrocarbyl-substituted maleic anhydride, a hydrocarbyl-substituted phthalic anhydride, or a combination thereof.

18 Claims, No Drawings

(56) References Cited

U.S. PATENT DOCUMENTS

| | | |
|---|---|---|
| 2014/0007494 A1 | 1/2014 | D'Alencon et al. |
| 2014/0331550 A1 | 11/2014 | Grabarse et al. |
| 2015/0096516 A1 | 4/2015 | Fang et al. |
| 2015/0096528 A1 | 4/2015 | Schwab et al. |
| 2015/0267138 A1 | 9/2015 | Bush et al. |
| 2016/0160142 A1 | 6/2016 | Reid et al. |
| 2017/0107438 A1 | 4/2017 | Greenfield et al. |
| 2019/0218471 A1 | 7/2019 | Mezger et al. |
| 2020/0024533 A1 | 1/2020 | Petts et al. |
| 2020/0056109 A1 | 2/2020 | Peretolchin et al. |
| 2020/0095513 A1 | 3/2020 | Petts et al. |
| 2020/0123461 A1 | 4/2020 | Petts et al. |
| 2020/0277534 A1 | 9/2020 | Petts et al. |
| 2020/0308486 A1 | 10/2020 | Mezger et al. |

FOREIGN PATENT DOCUMENTS

| | | |
|---|---|---|
| WO | 2015/011505 A1 | 1/2015 |
| WO | 2017/016909 A1 | 2/2017 |
| WO | 2017/096680 A1 | 6/2017 |

\* cited by examiner

ANTISTATIC FUEL ADDITIVES

CROSS REFERENCE TO RELATED APPLICATIONS

This application claims priority to U.S. Provisional Patent Application Ser. No. 63/299,342 filed on Jan. 13, 2022, the disclosure of which is incorporated herein by reference in its entirety.

FIELD OF THE INVENTION

An anti-static fuel additive composition and method for using the composition to reduce or prevent buildup of electrostatic charge is described. The anti-static fuel additive composition comprises a polysulfone and a copolymer derived from reaction of an alkanolamine and a hydrocarbyl-substituted succinic anhydride, a hydrocarbyl-substituted maleic anhydride, a hydrocarbyl-substituted phthalic anhydride, or a combination thereof.

BACKGROUND OF THE INVENTION

Organic material, such as a fuel, is generally a very poor electrical conductor. Electrical charges therefore tend to accumulate locally in such organic material and discharge as sparks in an uncontrolled manner. This electrical discharge property of the fuel can lead to explosions or fires on contact with air or oxygen since the fuel is usually combustible and often highly inflammable in the presence of air or oxygen. Suitable antistatic additives allow the electrical conductivity of fuels to be increased, so that static charges can no longer form and the risk of explosions and fires is reduced.

The efficacy of the known anti-static fuel additive compositions is still unsatisfactory. There is a need for an even more effective and longer-lasting increase in the electrical conductivity in fuels. Moreover, the anti-static fuel additive compositions should have an even higher thermal stability. For toxicity and environmental reasons, they should as far as possible be metal- and halogen-free. They should at least have a maximum flashpoint, in order that they can be handled safely, e.g., without explosion and fire risk, in the course of their preparation, their transport and their storage before use in the fuel.

BRIEF SUMMARY OF THE INVENTION

Disclosed herein are anti-static fuel additive compositions and methods for reducing or preventing buildup of electrostatic charges in fuel compositions. The anti-static fuel additive compositions comprise a polysulfone and a copolymer derived from reaction of an alkanolamine and a hydrocarbyl-substituted succinic anhydride, a hydrocarbyl-substituted maleic anhydride, a hydrocarbyl-substituted phthalic anhydride, or a combination thereof.

In the anti-static fuel additive compositions described herein, the polysulfone can be a sulfone copolymer derived from reaction of sulfur dioxide and a linear or branched 1-olefin having from 2 to 40 carbon atoms.

The anti-static fuel additive compositions also can have the alkanolamine be at least one nitrogen atom and at least one hydroxyl group connected by a $C_1$-$C_{30}$ alkylene, alkenylene, or arylene group.

Further, the alkanolamine can have a structure corresponding to Formula 1

(1)

wherein $R^1$ is independently $CH_2$ or $CHR^{10}$, wherein $R^{10}$ is alkyl or aryl; m is an integer from 1 to 10; and n is an integer of 2 or 3. Preferably, n is an integer of 3.

The anti-static fuel additive compositions described herein can have the alkanolamine of Formula 1 has a structure corresponding to Formula 1A

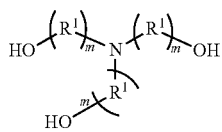

(1A)

wherein $R^1$ is independently $CH_2$ or $CHR^{10}$, wherein $R^{10}$ is alkyl or aryl; and m is independently an integer from 1 to 10.

The anti-static fuel additive composition can have an alkanolamine of Formula 1A having m independently be an integer of 2 to 6; m independently be an integer of 2 to 4; m independently be an integer of 2 or 3; m be an integer of 2.

For the alkanolamines of Formula 1 and 1A, $R^1$ can independently be $CH_2$ or $CHR^{10}$, wherein $R^{10}$ is $C_1$ to $C_6$ alkyl; $R^1$ can independently be $CH_2$ or $CHR^{10}$, wherein $R^{10}$ is methyl, ethyl, or propyl; $R^1$ can independently be $CH_2$ or $CHR^{10}$, wherein $R^{10}$ is methyl; preferably, $R^1$ is $CH_2$.

Additionally, the anti-static fuel additive compositions described herein, wherein the alkanolamine has a structure of Formula 2

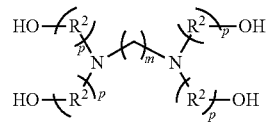

(2)

wherein $R^2$ is independently $CH_2$ or $CHR^{10}$, wherein $R^{10}$ is alkyl or aryl; m is an integer from 1 to 10; and p is independently an integer from 1 to 10.

Further, for the alkanolamines having the structure of Formula 2, wherein $R^2$ is independently $CH_2$ or $CHR^{10}$, wherein $R^{10}$ is $C_1$ to $C_6$ alkyl; $R^2$ is independently $CH_2$ or $CHR^{10}$, wherein $R^{10}$ is methyl, ethyl, or propyl; $R^2$ is independently $CH_2$ or $CHR^{10}$, wherein $R^{10}$ is methyl; preferably, $R^2$ is $CH_2$.

The alkanolamines having the structure of Formula 2 can have m be an integer from 2 to 6; m be an integer from 2 to 4; preferably, m is an integer of 2.

Further, for the anti-static fuel additive compositions including a product of an alkanolamine of Formula 2, p can independently be an integer from 2 to 6; p can independently be an integer from 2 to 4; preferably, p is an integer of 2.

The anti-static fuel additive compositions can have the copolymer be derived from the alkanolamine having a structure of Formula 3

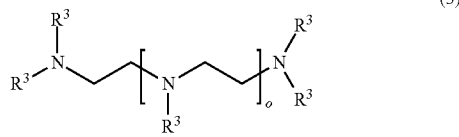

(3)

wherein $R^3$ is independently $(C(H)(R^{30}))_xOH$; $R^{30}$ is independently hydrogen, alkyl, or aryl; x is independently an integer from 1 to 10; and o is an integer from 0 to 100.

The alkanolamine of Formula 3 can have $R^{30}$ independently be hydrogen or $C_1$ to $C_6$ alkyl; $R^{30}$ independently be hydrogen, methyl, ethyl, or propyl; $R^{30}$ independently be hydrogen or methyl; $R^{30}$ can be methyl; preferably, $R^{30}$ is hydrogen.

For the alkanolamine of Formula 3, x can independently be an integer of 2 or 3; preferably, x is an integer of 2.

Also, for the alkanolamine of Formula 3, o is an integer of 0; o is an integer of 1; o is an integer of 2; or o is an integer of 3.

For the anti-static fuel additive compositions described herein, the copolymer can be derived from a 4 to 7-membered ring anhydride, for example, the hydrocarbyl-substituted succinic anhydride that is a succinic anhydride substituted with a substituted or unsubstituted, straight, branched, or cyclic $C_1$-$C_{40}$ alkyl, alkenyl, alkynyl, or aryl group.

Further, the hydrocarbyl-substituted succinic anhydride can have a structure of Formula

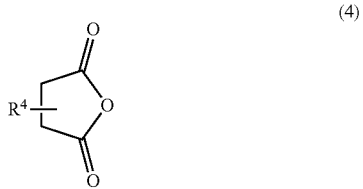

(4)

wherein $R^4$ is a substituted or unsubstituted, straight, branched, or cyclic $C_1$-$C_{40}$ alkyl, $C_2$-$C_{40}$ alkenyl, $C_2$-$C_{40}$ alkynyl, or $C_6$-$C_{12}$ aryl group.

Further, the hydrocarbyl-substituted succinic anhydride of Formula 4 can have a structure of Formula 4A

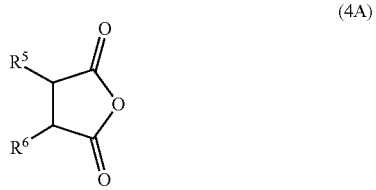

(4A)

Wherein $R^5$ is substituted or unsubstituted, straight, branched, or cyclic $C_1$-$C_{36}$ alkyl or $C_2$-$C_{36}$ alkenyl; and $R^6$ is hydrogen.

The anti-static fuel additive compositions described herein, wherein the copolymers derived from succinic anhydride having a structure of Formula 4A, wherein $R^5$ is substituted or unsubstituted, straight or branched $C_4$-$C_{24}$ alkyl or $C_4$-$C_{24}$ alkenyl; wherein $R^5$ is unsubstituted, straight or branched $C_4$-$C_{24}$ alkyl or $C_4$-$C_{24}$ alkenyl; wherein $R^5$ is substituted or unsubstituted, straight or branched $C_8$-$C_{20}$ alkyl or $C_8$-$C_{20}$ alkenyl; wherein $R^5$ is unsubstituted, straight or branched $C_8$-$C_{20}$ alkyl or $C_8$-$C_{20}$ alkenyl; wherein $R^5$ is unsubstituted, branched $C_{12}$-$C_{18}$ alkyl or $C_{12}$-$C_{18}$ alkenyl; wherein $R^5$ is iso-octadecenyl.

Also described are fuel compositions comprising a fuel and the anti-static fuel additive compositions.

The fuel compositions described herein, wherein the fuel comprises a low sulfur diesel.

The fuel compositions, wherein the anti-static fuel additive composition is present at a concentration of from 0.1 ppm to 100 ppm, from 0.5 ppm to 2 ppm based on the total weight of the fuel, the polysulfone, and the copolymer derived from reaction of an alkanolamine and a hydrocarbyl-substituted succinic anhydride.

A method for reducing or preventing buildup of electrostatic charge comprising contacting a fuel in need thereof with an effective antistatic amount of the anti-static fuel additive compositions described herein thereby reducing or preventing buildup of electrostatic charge.

The methods for reducing or preventing buildup of electrostatic charge described herein wherein the fuel comprises a low sulfur diesel.

Other objects and features will be in part apparent and in part pointed out hereinafter.

DETAILED DESCRIPTION OF THE INVENTION

The present disclosure is directed to anti-static fuel additive compositions, particularly for ultralow sulfur diesel fuels or middle distillate fuels. The anti-static fuel additive compositions described herein are cost effective, have acceptable performance, are compatible with other fuel additives, do not negatively affect fuel quality, have a non-flammable flash point (e.g., <61° C.), advantageous low temperature handling properties, and have application concentrations that are comparable to incumbent anti-static fuel additive compositions. The anti-static fuel additive compositions disclosed herein include a polysulfone and a copolymer derived from reaction of an alkanolamine and a hydrocarbyl-substituted succinic anhydride, maleic anhydride, phthalic anhydride, or a combination thereof. In particular, these anti-static fuel additive compositions are effective at a low dose rate, use a lower amount of polysulfone than other anti-static fuel additives and are cost effective.

An aspect of the present disclosure is directed to anti-static fuel additive compositions and methods for reducing or preventing buildup of electrostatic charges in fuel compositions. The anti-static fuel additive compositions comprise a polysulfone and a copolymer derived from reaction of an alkanolamine and a hydrocarbyl-substituted succinic anhydride, a hydrocarbyl-substituted maleic anhydride, a hydrocarbyl-substituted phthalic anhydride, or a combination thereof.

In the anti-static fuel additive compositions described herein, the polysulfone can be a sulfone copolymer derived from reaction of sulfur dioxide and a linear or branched 1-olefin having from 2 to 40 carbon atoms.

The structure and the known preparation processes for the sulfone copolymer are generally described in U.S. Pat. Nos. 3,917,466 and 4,416,688. The sulfone copolymer is preferably a copolymer of sulfur dioxide with one or more linear or branched 1-olefins having from 2 to 40 carbon atoms. Typically, the polysulfones of are alternating 1:1 copolymers in which one sulfone unit generally follows one olefin unit; it is also possible for sequences of two or more olefin units to occur in small amounts. Some of the olefin monomers may be replaced by ethylenically unsaturated carboxylic acids (e.g., acrylic acid, methacrylic acid or vinylacetic acid) or ethylenically unsaturated dicarboxylic acids (e.g., maleic acid or fumaric acid) or derivatives thereof (e.g., maleic anhydride), so that the copolymer of component (A) is formed especially from 50 mol % of sulfur dioxide or sulfone units, from 40 to 50 mol % of olefin units and from 0 to 10 mol % of units from said ethylenically unsaturated carboxylic acids, ethylenically unsaturated dicarboxylic acids or derivatives thereof Useful branched and especially linear 1-olefins having from 2 to 24 carbon atoms for preparing the polysulfone include, for example, ethene, propene, 1-butene, 2-butene, isobutene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene or mixtures thereof. Particular preference is given to linear 1-olefins having from 6 to 16 carbon atoms, especially having from 8 to 14 carbon atoms, or linear 1-olefins having from 12 to 22 carbon atoms, especially from 14 to 20 carbon atoms, and also mixtures thereof, for example a mixture of 1-dodecene and 1-tetradecene. It may also be advantageous to use mixtures of low molecular weight and high molecular weight 1-olefins, for example, 1-olefin mixtures with a bimodal distribution, to prepare the polysulfone. For example, mixtures of 1-olefins having from 6 to 13 carbon atoms and 1-olefins having from 14 to 20 carbon atoms, or mixtures of 1-olefins having from 6 to 10 carbon atoms and 1-olefins having from 11 to 15 carbon atoms, or mixtures of 1-olefins having from 2 to 24 carbon atoms and a single 1-olefin having from 4 to 10 carbon atoms could be used. When technical or other 1-olefin mixtures are used, the specification of the carbon atoms within the ranges specified above is based on the mean carbon atom number of these mixtures, where the mean carbon atom number is the sum over the mathematical products of fraction by weight and corresponding carbon atom number of all 1-olefins present in the mixture.

The sulfone copolymer of typically has a number-average molecular weight $M_n$ of from 2000 to 1 000 000, especially from 4000 to 100 000, in particular from 6000 to 25 000. The polydispersity (PDI—$M_w/M_n$) is generally in the range from 1.1 to 30, especially from 1.5 to 20, in particular from 2 to 10, most preferably from 2.3 to 5.

Typically, the polysulfones can be prepared using a suitable free-radical polymerization process in the temperature range from 0 to 50° C.; the solvents to be used are benzene, toluene or xylene; only a low molar excess of sulfur dioxide (a maximum of 1.5 times the molar amount) is employed; free-radical initiators such as peroxides or azo compounds and the additional irradiation with actinic light are recommended. The olefin-sulfur dioxide copolymers can be prepared by emulsion polymerization processes in aqueous medium.

The anti-static fuel additive compositions also can have the alkanolamine be at least one nitrogen atom and at least one hydroxyl group connected by a $C_1$-$C_{30}$ alkylene, alkenylene, or arylene group.

Further, the alkanolamine can have a structure corresponding to Formula 1

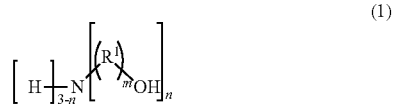

(1)

wherein $R^1$ is independently $CH_2$ or $CHR^{10}$, wherein $R^{10}$ is alkyl or aryl; m is an integer from 1 to 10, an integer from 1 to 8, an integer from 1 to 6, an integer from 1 to 5, an integer from 1 to 4, an integer from 1 to 3, an integer of 2 or 3, or an integer of 2; and n is an integer of 2 or 3. Preferably, n is an integer of 3.

The anti-static fuel additive compositions described herein can have the alkanolamine of Formula 1 has a structure corresponding to Formula 1A

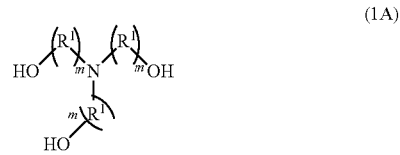

(1A)

wherein $R^1$ is independently $CH_2$ or $CHR^{10}$, wherein $R^{10}$ is alkyl or aryl; and m is independently an integer from 1 to 10.

The anti-static fuel additive composition can have an alkanolamine of Formula 1A having m independently be an integer of 1 to 8; independently an integer of 1 to 7; independently an integer of 1 to 6; independently an integer of 1 to 6; independently an integer of 1 to 5; independently an integer of 1 to 4; independently an integer of 1 to 3; independently an integer of 1 or 2; independently an integer of 2 to 8; independently an integer of 2 to 6; independently an integer of 2 to 4; independently an integer of 2 or 3; preferably, an integer of 2.

For the alkanolamines of Formula 1 and 1A, $R^1$ can independently be $CH_2$ or $CHR^{10}$, wherein $R^{10}$ is $C_1$ to $C_6$ alkyl; $R^1$ can independently be $CH_2$ or $CHR^{10}$, wherein $R^{10}$ is $C_1$ to $C_5$ alkyl; $R^1$ can independently be $CH_2$ or $CHR^{10}$, wherein $R^{10}$ is $C_1$ to $C_4$ alkyl; $R^1$ can independently be $CH_2$ or $CHR^{10}$, wherein $R^{10}$ is methyl, ethyl, or propyl; $R^1$ can independently be $CH_2$ or $CHR^{10}$, wherein $R^{10}$ is methyl; preferably, $R^1$ is $CH_2$.

Also, for the alkanolamines of Formula 1 and 1A, $R^1$ can independently be $CH_2CH(R^{10})$, wherein $R^{10}$ is hydrogen, alkyl or aryl. $R^1$ can independently be $CH_2CH(R^{10})$, wherein $R^{10}$ is hydrogen or $C_1$ to $C_5$ alkyl; $R^1$ can independently be $CH_2CH(R^{10})$, wherein $R^{10}$ is hydrogen or $C_1$ to $C_4$ alkyl; $R^1$ can independently be $CH_2CH(R^{10})$, wherein $R^{10}$ is hydrogen, methyl, ethyl, or propyl; $R^1$ can independently be $CH_2CH(R^{10})$, wherein $R^{10}$ is hydrogen or methyl; preferably, $R^1$ is $CH_2CH(R^{10})$, wherein $R^{10}$ is hydrogen.

Additionally, the anti-static fuel additive compositions described herein, wherein the alkanolamine has a structure of Formula 2

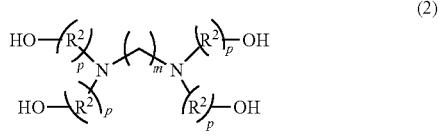

(2)

wherein $R^2$ is independently $CH_2$ or $CHR^{10}$, wherein $R^{10}$ is alkyl or aryl; m is an integer from 1 to 10; and p is independently an integer from 1 to 10.

Further, for the alkanolamines having the structure of Formula 2, wherein $R^2$ is independently $CH_2$ or $CHR^{10}$, wherein $R^{10}$ is $C_1$ to $C_6$ alkyl; $R^2$ is independently $CH_2$ or $CHR^{10}$, wherein $R^{10}$ is $C_1$ to $C_5$ alkyl; $R^2$ is independently $CH_2$ or $CHR^{10}$, wherein $R^{10}$ is $C_1$ to $C_4$ alkyl; $R^2$ is independently $CH_2$ or $CHR^{10}$, wherein $R^{10}$ is methyl, ethyl, or propyl; $R^2$ is independently $CH_2$ or $CHR^{10}$, wherein $R^{10}$ is methyl; preferably, $R^2$ is $CH_2$.

Also, for the alkanolamines of Formula 2 and 1A, $R^2$ can independently be $CH_2CH(R^{10})$, wherein $R^{10}$ is hydrogen, alkyl or aryl. $R^2$ can independently be $CH_2CH(R^{10})$, wherein $R^{10}$ is hydrogen or $C_1$ to $C_5$ alkyl; $R^2$ can independently be $CH_2CH(R^{10})$, wherein $R^{10}$ is hydrogen or $C_1$ to $C_4$ alkyl; $R^2$ can independently be $CH_2CH(R^{10})$, wherein $R^{10}$ is hydrogen, methyl, ethyl, or propyl; $R^2$ can independently be $CH_2CH(R^{10})$, wherein $R^{10}$ is hydrogen or methyl; preferably, $R^2$ is $CH_2CH(R^{10})$, wherein $R^{10}$ is hydrogen.

The alkanolamines having the structure of Formula 2 can have m be an integer from 1 to 8; an integer from 1 to 6; an integer from 1 to 5; an integer from 1 to 4; an integer from 1 to 3; an integer of 1 or 2; an integer from 2 to 8; an integer from 2 to 6; an integer from 2 to 5; an integer from 2 to 4; an integer of 2 or 3; preferably, m is an integer or 2.

Further, for the anti-static fuel additive compositions including a product of an alkanolamine of Formula 2, p can independently be an integer from 1 to 8; an integer from 1 to 6; an integer from 1 to 4; an integer from 1 to 3; an integer of 1 or 2; an integer of from 2 to 8; an integer of from 2 to 6; an integer of from 2 to 4; an integer from 2 to 4; an integer of 2 or 3; preferably, p is an integer of 2.

The anti-static fuel additive compositions can have the copolymer be derived from the alkanolamine having a structure of Formula 3

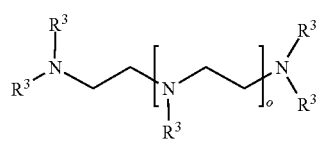
(3)

wherein $R^3$ is independently $(C(H)(R^{30}))_xOH$; $R^{30}$ is independently hydrogen, alkyl, or aryl; x is independently an integer from 1 to 10; and o is an integer from 0 to 100.

The alkanolamine of Formula 3 can have $R^{30}$ independently be hydrogen or $C_1$ to $C_6$ alkyl; $R^{30}$ independently be hydrogen, methyl, ethyl, or propyl; $R^{30}$ independently be hydrogen or methyl; $R^{30}$ can be methyl; preferably, $R^{30}$ is hydrogen.

For the alkanolamine of Formula 3, x can independently be an integer of 1 to 9; an integer of 1 to 8; an integer of 1 to 7; an integer of 1 to 6; an integer of 1 to 5; an integer of 1 to 4; an integer of 2 to 10; an integer of 2 to 8; an integer of 2 to 6; an integer of 2 to 5; an integer of 2 to 4; an integer of 2 or 3; preferably, x is an integer of 2.

Also, for the alkanolamine of Formula 3, o is an integer of 0 to 80; o is an integer of 0 to 60; o is an integer of 0 to 40; o is an integer of 0 to 20; o is an integer of 0 to 10; o is an integer of 0 to 8; o is an integer of 0 to 7; o is an integer of 0 to 6; o is an integer of 0 to 5; o is an integer of 1 to 10; o is an integer of 1 to 8; o is an integer of 1 to 6; o is an integer of 1 to 5; o is an integer of 1 to 4; o is an integer of 2 to 10; o is an integer of 2 to 8; o is an integer of 2 to 6; o is an integer of 2 to 5; o is an integer of 2 to 4; o is an integer of 0; o is an integer of 1; o is an integer of 2; or o is an integer of 3.

For the anti-static fuel additive compositions described herein, the copolymer can be derived from the hydrocarbyl-substituted succinic anhydride that is a succinic anhydride substituted with a substituted or unsubstituted, straight, branched, or cyclic $C_1$-$C_{40}$ alkyl, alkenyl, alkynyl, or aryl group.

Further, the hydrocarbyl-substituted succinic anhydride can have a structure of Formula 4

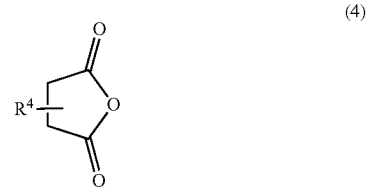
(4)

wherein $R^4$ is a substituted or unsubstituted, straight, branched, or cyclic $C_1$-$C_{40}$ alkyl, $C_2$-$C_{40}$ alkenyl, $C_2$-$C_{40}$ alkynyl, or $C_6$-$C_{12}$ aryl group.

Further, the hydrocarbyl-substituted succinic anhydride of Formula 4 can have a structure of Formula 4A

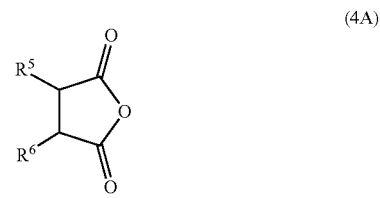
(4A)

wherein $R^5$ is substituted or unsubstituted, straight, branched, or cyclic $C_1$-$C_{36}$ alkyl or $C_2$-$C_{36}$ alkenyl; and $R^6$ is hydrogen.

The anti-static fuel additive compositions described herein, wherein the copolymers derived from succinic anhydride having a structure of Formula 4A, wherein $R^5$ is substituted or unsubstituted, straight or branched $C_4$-$C_{24}$ alkyl or $C_4$-$C_{24}$ alkenyl; wherein $R^5$ is unsubstituted, straight or branched $C_4$-$C_{24}$ alkyl or $C_4$-$C_{24}$ alkenyl; wherein $R^5$ is substituted or unsubstituted, straight or branched $C_8$-$C_{20}$ alkyl or $C_8$-$C_{20}$ alkenyl; wherein $R^5$ is unsubstituted, straight or branched $C_8$-$C_{20}$ alkyl or $C_8$-$C_{20}$ alkenyl; wherein $R^5$ is unsubstituted, branched $C_{12}$-$C_{18}$ alkyl or $C_{12}$-$C_{18}$ alkenyl; wherein $R^5$ is iso-octadecenyl.

Also described are fuel compositions comprising a fuel and the anti-static fuel additive compositions.

The fuel compositions described herein can have the fuel comprise a low sulfur diesel.

The fuel compositions can have the anti-static fuel additive composition be present at a concentration (e.g., an effective anti-static amount) of from 0.1 ppm to 100 ppm, from 0.1 ppm to 80 ppm, from 0.1 ppm to 60 ppm, from 0.1 ppm to 50 ppm, from 0.1 ppm to 40 ppm, from 0.1 ppm to 30 ppm, from 0.1 ppm to 20 ppm, from 0.1 ppm to 10 ppm, from 0.1 ppm to 5 ppm, from 0.1 ppm to 2 ppm, 0.3 ppm to 100 ppm, from 0.3 ppm to 80 ppm, from 0.3 ppm to 60 ppm, from 0.3 ppm to 50 ppm, from 0.3 ppm to 40 ppm, from 0.3 ppm to 30 ppm, from 0.3 ppm to 20 ppm, from 0.3 ppm to 10 ppm, from 0.3 ppm to 5 ppm, from 0.3 ppm to 2 ppm, 0.5 ppm to 100 ppm, from 0.5 ppm to 80 ppm, from 0.5 ppm to 60 ppm, from 0.5 ppm to 50 ppm, from 0.5 ppm to 40 ppm, from 0.5 ppm to 30 ppm, from 0.5 ppm to 20 ppm, from 0.5 ppm to 10 ppm, from 0.5 ppm to 5 ppm; preferably, from 0.5 ppm to 2 ppm based on the total weight of the fuel, the polysulfone as dosed, and the copolymer derived from reaction of an alkanolamine and a hydrocarbyl-substituted succinic anhydride as dosed.

The polysulfone is used as is received and includes solvents and other carriers in the concentration as dosed.

The copolymer derived from reaction of an alkanolamine and a hydrocarbyl-substituted succinic anhydride is from about 50 to 100 wt. %, from about 55 to 100 wt. %, from about 60 to 100 wt. %, from about 65 to 100 wt. %, from about 70 to 100 wt. % actives concentration. The concentration in the composition is based on the copolymer composition as applied and not on the actives concentration of the copolymer.

Also disclosed are methods for reducing or preventing buildup of electrostatic charge comprising contacting a fuel in need thereof with an effective antistatic amount of the anti-static fuel additive compositions described herein thereby reducing or preventing buildup of electrostatic charge.

The methods for reducing or preventing buildup of electrostatic charge described herein can have the fuel comprise a low sulfur diesel.

The copolymers, e.g., poly(aminoalkanol-alkenylsuccinic anhydride (ASA)) ester chemistries, disclosed here in combination with polsulfone antistatic additives, are synthesized by polycondensation of aminoalkanols and alkenylsuccinic anhydrides (ASA) in an organic solvent. The reactions are carried out at a temperature of 165 to 190° C. for 6 to 9 hours and water is removed using Dean Stark apparatus. Para-toluene sulfonic acid is used as catalyst in some reactions.

For the polycondensation, the aminoalkanols or alkanol amines are consisted of but not limited to amino EO/PO, amino alkylene oxides, or alike. The aminoalkanols consist of, at least one nitrogen to multiple nitrogens and at least one alkanol group to multiple alkanols ($C_1$ to $C_{40}$ with or without other atoms, diversified structures or functionalities).

The ASAs are consisted of, but not limited to, alkyl, alkenyl, alkynyl or aryl ($C_1$-$C_{40}$ with or without other atoms, diversified structures or functionalities) succinic anhydrides. The ASAs may be mono-substituted to multi-substituted. The ASAs include alternatives such as $C_3$ to $C_{40}$ dicarbonyl compounds.

In particular, the copolymer derived from reaction of an alkanolamine and a hydrocarbyl-substituted succinic anhydride can be prepared using a synthetic method that includes adding an alkenylsuccinic anhydride (ASA) at a particular concentration in equivalents relative to the alkanolamine reactant to a reactor fitted with a nitrogen tube, a heating mantle, a temperature probe, and a Dean-Stark apparatus and a condenser. Optionally, a solvent can also be added to the reactor. With stirring, an alkanolamine is added to the ASA in the reactor, and optionally, an acid catalyst is added. The reaction mixture is gradually heated to about 125° C. to about 190° C. for 1 to 9 hours under nitrogen purging until the completion of the reaction. The reaction product is cooled and then formulated as needed to evaluate performance as an anti-static agent.

The polycondensation reaction can be performed with or without a solvent. The solvent that can be used includes, but is not limited to, a hydrocarbon oil, olefinic hydrocarbon oil, aromatics, heavy aromatics, diesel, biodiesel, organic solvents, surfactants, alike, or a combination thereof.

The acid catalyst can be p-toluene sulfonic acid, benzenesulfonic acid, methanesulfonic acid, naphthalenesulfonic acid, xylenesulfonic acid, sulfuric acid, or a combination thereof. The concentration of the acid catalyst can be from about 0.01 wt. % to about 0.1 wt. %, preferably about 0.05 wt. %.

The alkanolamines are generally described above in connection with the alkanolamines having the structures of Formulae 1, 1A, 2, and 3. In particular, the following alkanolamines can be used:

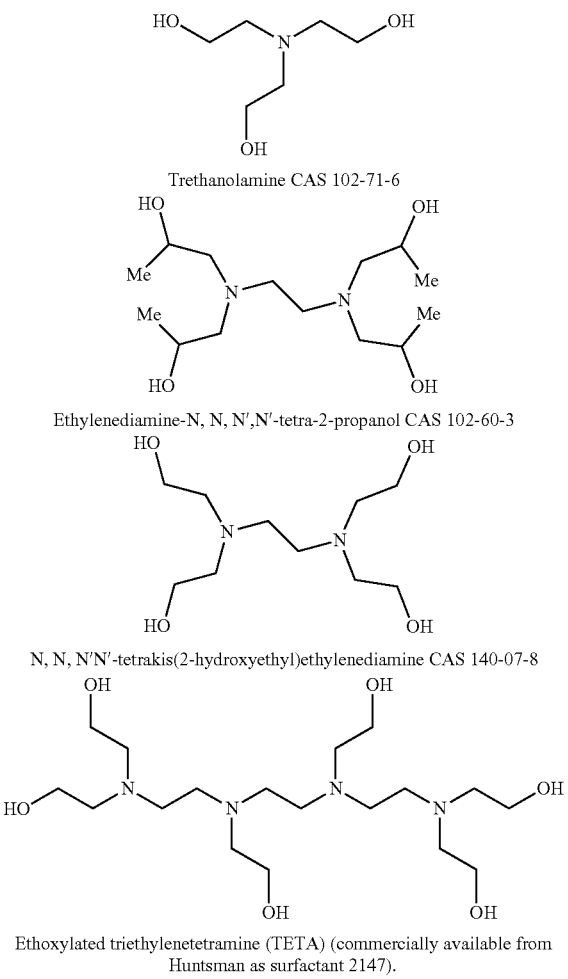

The alkyl succinic anhydrides (ASA) of Formulae 4 and 4A also can have the following structures:

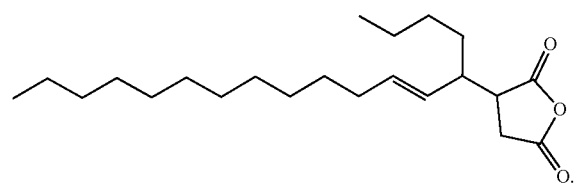

The poly(aminoakanol-ASA) may be a polyester or a polyester consisting of esters and amides, imides, acids, anionics, cationics, betaines, or a combination. The polymer consists at least two repeating ester units of aminoakanol-ASA.

Further, the copolymers derived from reaction of an alkanolamine and a hydrocarbyl-substituted succinic anhydride can be identified as poly (TEA-iODSA) that is copolymerized from triethanolamine (TEA) and iso-octadecenyl succinic anhydride (iODSA); poly (EDTP-iODSA) that is copolymerized from ethylene diamine-N,N,N',N'-tetra-2-propanol (EDTP) and iso-octadecenyl succinic anhydride (iODSA); poly(THEED-iODSA) that is copolymerized from tetrakis(2-hydroxyethyl)ethylenediamine (THEED) and iso-octadecenyl succinic anhydride (iODSA); and poly (Sur2147-iODSA) that is copolymerized from ethoxylated triethylenetetramine (TETA), sold as Huntsman Surfactant 2147 and iso-octadecenyl succinic anhydride (iODSA); and poly(Sur2147-HDSA) that is copolymerized from Huntsman Surfactant 2147 and hexadecenyl succinic anhydride (HDSA).

Having described the invention in detail, it will be apparent that modifications and variations are possible without departing from the scope of the invention defined in the appended claims.

EXAMPLES

The following non-limiting examples are provided to further illustrate the present invention.

Example 1: Synthesis of Copolymers Derived from Reaction of an Alkanolamine and a Hydrocarbyl-Substituted Succinic Anhydride To a reactor in a heating mantle installed with nitrogen tube, temperature probe, Dean-Stark apparatus, and condenser was charged an alkenylsuccinic anhydride (ASA) in equivalent(s) relative to an alkanolamine specified in Table A under inert nitrogen atmosphere, optionally followed by addition of a solvent (e.g., at 20 wt. % of heavy aromatic naphtha (HAN)).

While mixing, an alkanolamine was added to the reactor in equivalent(s) relative to ASA specified in Table A, optionally followed by addition of an acid catalyst. For example, p-toluene-sulfonic acid (0.05%) was used as catalyst.

The reaction mixture was gradually heated to 125° C. to 180° C. for 1 to 5 hours under nitrogen purging until the reaction was completed.

The reaction product was cooled and formulated as needed for performance evaluation. The aminoalkanol and ASA abbreviations are as follows:
TEA—triethanolamine
Surf 2147—ethoxylated triethylenetetramine
THEED—tetrakis(2-hydroxyethyl)ethylenediamine
EDTP—ethylene diamine-N,N,N',N'-tetra-2-propanol
DDSA—dodecyl succinic anhydride
iODSA—iso-octadecenyl succinic anhydride
HDSA—hexadecenyl succinic anhydride
HAN—heavy aromatic naphtha

| Sample ID | Aminoalkanol (eq) | ASA (eq) | Solvent |
|---|---|---|---|
| 101* | TEA (1 eq) | DDSA (1 eq) | HAN |
| 102 | Surf2147 (1 eq) | iODSA (3 eq) | HAN |
| 103 | Surf2147 (1 eq) | HDSA (3 eq) | HAN |
| 104 | THEED (1 eq) | iODSA (4 eq) | HAN |
| 105 | TEA (1 eq) | iODSA (1 eq) | HAN |
| 106 | THEED (1 eq) | iODSA (1 eq) | HAN |
| 107 | THEED (1 eq) | iODSA (2 eq) | HAN |
| 108* | THEED (1 eq) | iODSA (3 eq) | HAN |
| 109 | EDTP (1 eq) | iODSA (1 eq) | HAN |
| 110 | EDTP (1 eq) | iODSA (2 eq) | HAN |

*Diluted with toluene to 0.25% (weight/volume) as a stock solution for all the tests Example 2: Evaluation of Copolymers Derived from Reaction of an Alkanolamine and a Hydrocarbyl-Substituted Succinic Anhydride (i.e., Poly(Aminoalkanol-ASA)Ester) as Antistatic Additive for Diesel Fuel A series of copolymers were synthesized and evaluated for their efficacy as antistatic additive by measuring conductivity of ULSD treated with 0.25-1 ppm of copolymer (as formulated) following the ASTM D2624-02 testing protocol (Table 1). Conductivity of the synthesized chemistries themselves was found to be very low compared to a commercial polysulfone based product.

TABLE 1

Conductivity data of diesel fuel treated with 0.25-5 pmm of poly(aminoalkanolASA)esters

| Sample ID | Conductivity at 0.25 ppm actives (pS/m) | Conductivity at 0.5 ppm actives (pS/m) | Conductivity at 1 ppm actives (pS/m) | Conductivity at 5 ppm actives (pS/m) |
|---|---|---|---|---|
| Commercial polysulfone product | 37 | 83 | 170 | — |
| 101 | 4 | 6 | NA | 9 |
| 102 | 4 | 7 | 8 | NA |
| 103 | 3 | 6 | 8 | NA |
| 104 | 3 | 6 | 8 | NA |
| 105 | NA | NA | 3 | 4 |
| 106 | 4 | 8 | NA | 15 |
| 107 | 4 | 7 | NA | 17 |
| 108 | 4 | 7 | 8 | 8 |
| 109 | NA | NA | 2 | 4 |
| 110 | NA | NA | 3 | 5 |

Example 3: Evaluation of Poly(Aminoalkanol-ASA)Esters as Synergists for Polysulfone Based Product for Diesel Fuel The conductivity data of diesel fuel treated with 0.5 ppm polysulfone and varying amounts (0.25-1 ppm) of poly (aminoalkanol-ASA)esters is presented in tables 2-4. In this testing, specified amounts of polysulfone and poly(aminoalkanol-ASA)ester chemistries were both added to diesel fuel.

Surprisingly, the poly(aminoalkanol-ASA)ester chemistries were found to boost the performance of polysulfone based product (up to by 145%) in ULSD (Table 2, entries 2 and 3; Table 3, entries 2, and 7; Table 4, entries 1, 2 and 3). For example, addition of 0.25 ppm of Composition 106 to diesel fuel containing 0.5 ppm polysulfone increases its conductivity from 83 pS/m to 170 pS/m (Table 2, entry 2). An increase in conductivity by 107% was observed in the case.

TABLE 2

Conductivity data of diesel fuel treated with 0.5 ppm
polysulfone and 0.25 ppm poly(aminoalkanol-ASA)esters

| Entry | Additives | Additive actives (ppm) | Conductivity (pS/m) | Conductivity increase (pS/m) | Conductivity increase by |
|---|---|---|---|---|---|
| 1 | 101 | 0.25 | 95 | 13 | 16% |
| 2 | 106 | 0.25 | 170 | 88 | 107% |
| 3 | 107 | 0.25 | 155 | 73 | 89% |
| 4 | 108 | 0.25 | 103 | 21 | 26% |

TABLE 3

Conductivity data of diesel fuel treated with 0.5 ppm
polysulfone and 0.5 ppm poly(aminoalkanol-ASA) ester

| Entry | Additives | Additive actives (ppm) | Conductivity (pS/m) | Conductivity increase (pS/m) | Conductivity increase by |
|---|---|---|---|---|---|
| 1 | 101 | 0.50 | 111 | 29 | 35% |
| 2 | 105 | 0.50 | 164 | 82 | 100% |
| 3 | 106 | 0.50 | 171 | 89 | 109% |
| 5 | 107 | 0.50 | 104 | 22 | 27% |
| 6 | 108 | 0.50 | 113 | 31 | 38% |
| 7 | 109 | 0.50 | 153 | 71 | 87% |
| 8 | 110 | 0.50 | 122 | 40 | 49% |

TABLE 4

Conductivity data of diesel fuel treated with 0.5 ppm
polysulfone and 1 ppm poly(aminoalkanol-ASA) ester

| Entry | Additives | Additive actives (ppm) | Conductivity (pS/m) | Conductivity increase (pS/m) | Conductivity increase by |
|---|---|---|---|---|---|
| 1 | 101 | 1.00 | 131 | 49 | 60% |
| 2 | 106 | 1.00 | 201 | 119 | 145% |
| 3 | 107 | 1.00 | 122 | 40 | 49% |
| 4 | 108 | 1.00 | 135 | 53 | 65% |

Example 4: Preparation of Antistatic Additive Compositions

Antistatic additive compositions (table 5) were prepared by blending specified amounts (wt %) of poly(aminoalkanol-ASA)esters and polysulfone. These formulas have been stable on shelf for more than two months.

TABLE 5

Antistatic compositions comprising polysulfone
and poly(aminoalkanol ASA)esters

| Formula ID | Poly(aminoalkanol ASA)esters, wt % | wt % of polysulfone | Total |
|---|---|---|---|
| Formula 1 | 105, 70% | 30% | 100% |
| Formula 2 | 105, 50% | 50% | 100% |
| Formula 3 | 105, 30% | 70% | 100% |
| Formula 4 | 102, 70% | 30% | 100% |
| Formula 5 | 102, 50% | 50% | 100% |
| Formula 6 | 102, 30% | 70% | 100% |
| Formula 7 | 103, 30% | 70% | 100% |
| Formula 8 | 104, 30% | 70% | 100% |

Example 5: Evaluation of Antistatic Additive Compositions (Formulas 1-8) in Different Diesel Fuels Conductivity data of different diesel fuels treated with varying amounts of incumbent antistatic additive (polysulfone) and antistatic additive formulas 1-5 is presented in tables 6, 7 and 8. In fuel #1, formula-3, formula 6, formula 7 and formula 8 performed better than polysulfone based antistatic additive alone whereas in diesel fuels #2 and #3, formula 2 and formula 3 performed better than two commercial polysulfone based products. Based on the performance evaluation, the synergist boosts the performance of polysulfone antistatic additives in different fuels

TABLE 6

Conductivity data of diesel fuel #1 treated with varying amounts of incumbent
antistatic additive (polysulfone) and antistatic additive formulas 1-8

| Treat Rate ppm | η(pS/m) Poly-sulfone | η (pS/m) Formula 1 | η (pS/m) Formula 2 | η (pS/m) Formula 3 | η (pS/m) Formula 4 | η (pS/m) Formula 5 | η (pS/m) Formula 6 | η (pS/m) Formula 7 | η (pS/m) Formula 8 |
|---|---|---|---|---|---|---|---|---|---|
| 0 | 1 | 1 | 1 | 1 | 1 | 1 | 1 | 1 | 1 |
| 0.5 | 90 | 64 | 71 | 103 | 68 | 73 | 95 | 99 | 94 |
| 1 | 157 | 130 | 153 | 212 | 113 | 127 | 194 | 177 | 189 |
| 1.5 | 242 | 192 | 226 | 289 | 176 | 230 | 289 | 260 | 283 |

TABLE 7

Conductivity data of diesel fuel #2 treated with varying amounts of incumbent
antistatic additives (polysulfone) and antistatic additive formulas 1-3

| Treat Rate, ppm | η(pS/m) Polysulfone-1 | η(pS/m) Formula 3 | η(pS/m) Formula 2 | η(pS/m) Formula 1 | η(pS/m) Polysulfone-2 |
|---|---|---|---|---|---|
| 0 | 3 | 3 | 3 | 3 | 3 |
| 0.5 | 48 | 92 | 62 | 61 | 52 |

TABLE 7-continued

Conductivity data of diesel fuel #2 treated with varying amounts of incumbent antistatic additives (polysulfone) and antistatic additive formulas 1-3

| Treat Rate, ppm | η(pS/m) Polysulfone-1 | η(pS/m) Formula 3 | η(pS/m) Formula 2 | η(pS/m) Formula 1 | η(pS/m) Polysulfone-2 |
| --- | --- | --- | --- | --- | --- |
| 1 | 61 | 138 | 138 | 91 | 85 |
| 1.5 | 128 | 245 | 191 | 134 | 133 |

TABLE 8

Conductivity data of diesel fuel #3 treated with varying amounts of incumbent antistatic additive (polysulfone) and antistatic additive formulas 1-3

| Treat Rate, ppm | η(pS/m) Polysulfone | η(pS/m) Formula 3 | η(pS/m) Formula 2 | η(pS/m) Formula 1 |
| --- | --- | --- | --- | --- |
| 0 | 1 | 1 | 1 | 1 |
| 0.5 | 60 | 83 | 81 | 36 |
| 1 | 107 | 148 | 124 | 79 |
| 1.5 | 160 | 213 | 197 | 124 |

The poly(aminoalkanol-ASA) antistatic synergism with polysulfones may be applied to other antistatics or charge dissipants. The applications may be for distillate fuels, diesel fuels, ultralow sulfur diesels (ULSD), biodiesel fuels, oils, organic solvents, or alike.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description shall be interpreted as illustrative and not in a limiting sense.

The invention claimed is:

1. An anti-static fuel additive composition comprising a polysulfone and a copolymer derived from reaction of an alkanolamine and a hydrocarbyl-substituted 4-membered to 7-membered ring anhydride, wherein the alkanolamine has a structure corresponding to Formula 1A, Formula 2, or Formula 3

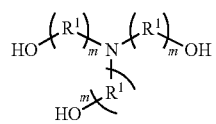

(1A)

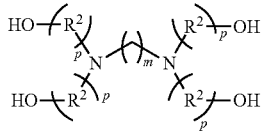

(2)

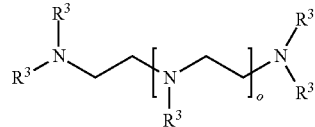

(3)

wherein
$R^1$ and $R^2$ are independently $CH_2$ or $CHR^{10}$, wherein $R^{10}$ is alkyl or aryl;
$R^3$ is independently $(C(H)(R^{30}))_x OH$;
$R^{30}$ is independently hydrogen, alkyl, or aryl;
m is independently an integer from 1 to 10;
p is independently an integer from 1 to 10;
x is independently an integer from 1 to 10; and
o is an integer from 0 to 100.

2. The anti-static fuel additive composition of claim 1, wherein the hydrocarbyl-substituted 4-membered to 7-membered ring anhydride comprises a hydrocarbyl-substituted succinic anhydride, a hydrocarbyl-substituted maleic anhydride, a hydrocarbyl-substituted phthalic anhydride, or a combination thereof.

3. The anti-static fuel additive composition of claim 2, wherein the polysulfone comprises a sulfone copolymer derived from reaction of sulfur dioxide and a linear or branched 1-olefin having from 2 to 40 carbon atoms.

4. The anti-static fuel additive composition of claim 3, wherein the alkanolamine has a structure of Formula 1A, m is an integer of 2 or 3, and $R^1$ is independently $CH_2$ or $CHR^{10}$, wherein $R^{10}$ is methyl, ethyl, or propyl.

5. The anti-static fuel additive composition of claim 3, wherein the alkanolamine has a structure of Formula 2, $R^2$ is independently $CH_2$ or $CHR^{10}$, wherein $R^{10}$ is methyl, ethyl, or propyl; m is an integer from 2 to 4; and p is independently an integer from 2 to 4.

6. The anti-static fuel additive composition of claim 5, wherein $R^2$ is independently $CH_2$ or $CHR^{10}$, wherein $R^{10}$ is methyl; m is an integer of 2; and p is an integer of 2.

7. The anti-static fuel additive composition of claim 3, wherein the alkanolamine has a structure of Formula 3, $R^{30}$ is independently hydrogen, methyl, ethyl, or propyl; x is independently an integer of 2 or 3; and o is an integer of 0, 1, 2, or 3.

8. The anti-static fuel additive composition of claim 7, wherein $R^{30}$ is independently hydrogen or methyl; x is an integer of 2; and o is an integer of 0 or 2.

9. The anti-static fuel additive composition of claim 3, wherein the hydrocarbyl-substituted 4-membered to 7-membered ring anhydride is a succinic anhydride substituted with a substituted or unsubstituted, straight, branched, or cyclic $C_1$-$C_{40}$ alkyl, alkenyl, alkynyl, or aryl group.

10. The anti-static fuel additive composition of claim 9, wherein the hydrocarbyl-substituted succinic anhydride has a structure of Formula 4

(4)

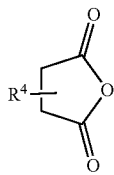

wherein R⁴ is a substituted or unsubstituted, straight, branched, or cyclic $C_1$-$C_{40}$ alkyl, $C_2$-$C_{40}$ alkenyl, $C_2$-$C_{40}$ alkynyl, or $C_6$-$C_{12}$ aryl group.

11. The anti-static fuel additive composition of claim 10, wherein the hydrocarbyl-substituted succinic anhydride of Formula 4 has a structure of Formula 4A (4A)

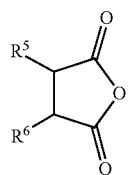

wherein
R⁵ is substituted or unsubstituted, straight, branched, or cyclic $C_1$-$C_{36}$ alkyl or $C_2$-$C_{36}$ alkenyl; and
R⁶ is hydrogen.

12. The anti-static fuel additive composition of claim 11, wherein R⁵ is unsubstituted, straight or branched $C_8$-$C_{20}$ alkyl or $C_8$-$C_{20}$ alkenyl.

13. A fuel composition comprising a fuel and the anti-static fuel additive composition of claim 1.

14. The fuel composition of claim 13, wherein the fuel comprises a low sulfur diesel.

15. The fuel composition of claim 14, wherein the anti-static fuel additive composition is present at a concentration of from 0.1 ppm to 100 ppm based on the total weight of the fuel, the polysulfone, and the copolymer derived from reaction of an alkanolamine and a hydrocarbyl-substituted succinic anhydride.

16. A method for reducing or preventing buildup of electrostatic charge comprising contacting a fuel in need thereof with an effective antistatic amount of the anti-static fuel additive composition of claim 1 thereby reducing or preventing buildup of electrostatic charge.

17. The anti-static fuel additive composition of claim 1, wherein the composition comprises from about 30 wt. % to about 70 wt. % of the polysulfone and from about 30 wt. % to about 70 wt. % of the copolymer derived from reaction of an alkanolamine and a hydrocarbyl-substituted 4-membered to 7-membered ring anhydride.

18. The fuel composition of claim 15, wherein the anti-static fuel additive composition is present at a concentration of from 0.5 ppm to 2 ppm.

* * * * *

UNITED STATES PATENT AND TRADEMARK OFFICE
CERTIFICATE OF CORRECTION

PATENT NO. : 12,195,686 B2
APPLICATION NO. : 18/153151
DATED : January 14, 2025
INVENTOR(S) : Xiaojin Harry Li et al.

Page 1 of 1

It is certified that error appears in the above-identified patent and that said Letters Patent is hereby corrected as shown below:

On the Title Page

Item (57) Abstract, Line 6:
Delete "7-memebered" and insert -- 7-membered -- therefor.

Signed and Sealed this
First Day of April, 2025

Coke Morgan Stewart
*Acting Director of the United States Patent and Trademark Office*